United States Patent [19]

Alberti

[11] 4,213,927
[45] Jul. 22, 1980

[54] METHOD OF MAKING PICTURE PHONOGRAPH RECORD

[76] Inventor: John D. Alberti, 1528 Turnbull Canyon Rd., Hacienda Heights, Calif. 91745

[21] Appl. No.: 53,341

[22] Filed: Jun. 29, 1979

Related U.S. Application Data

[60] Division of Ser. No. 945,305, Sep. 25, 1978, which is a continuation-in-part of Ser. No. 836,500, Sep. 26, 1977, abandoned.

[51] Int. Cl.² ............................................. B29D 17/00
[52] U.S. Cl. .................................. 264/107; 274/42 P; 425/810
[58] Field of Search ............. 264/107; 425/DIG. 810; 274/42 P

[56] References Cited

U.S. PATENT DOCUMENTS

| | | | |
|---|---|---|---|
| 1,050,932 | 1/1913 | Emerson | 264/107 X |
| 3,247,298 | 4/1966 | Utigen | 264/107 |
| 3,584,094 | 6/1971 | Rock | 264/107 |
| 3,662,051 | 5/1972 | Harlow | 264/107 |
| 3,687,769 | 8/1972 | Dague | 264/107 X |

FOREIGN PATENT DOCUMENTS 890417 2/1962 United Kingdom ..................... 264/107

*Primary Examiner*—Thomas P. Pavelko
*Attorney, Agent, or Firm*—Sellers and Brace

[57] ABSTRACT

A picture phonograph record and method of making the same having an imprinted core sheet sandwiched between transparent layers one of which comprises a relatively thin preformed plastic foil and the other of which is a relatively rigid and thick layer dispersed radially over the core sheet from a hot fluent lump of plastic positioned between heated pressurized mold platens. Sound tracks are impressed onto the face of one or both plastic layers concurrently with the extrusion of the lump to form the thick plastic layer. At least the thicker and usually both layers become inseparably adherent to the adjacent face of the core sheet as an incident of the assembly and sound track impressing operation.

10 Claims, 4 Drawing Figures

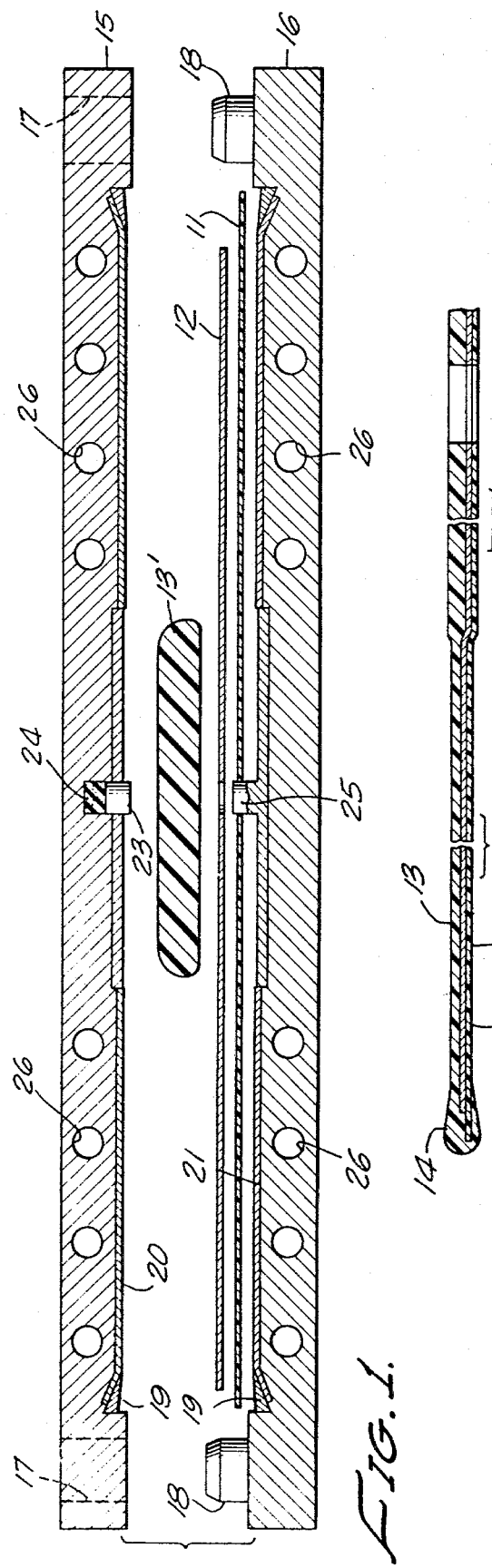
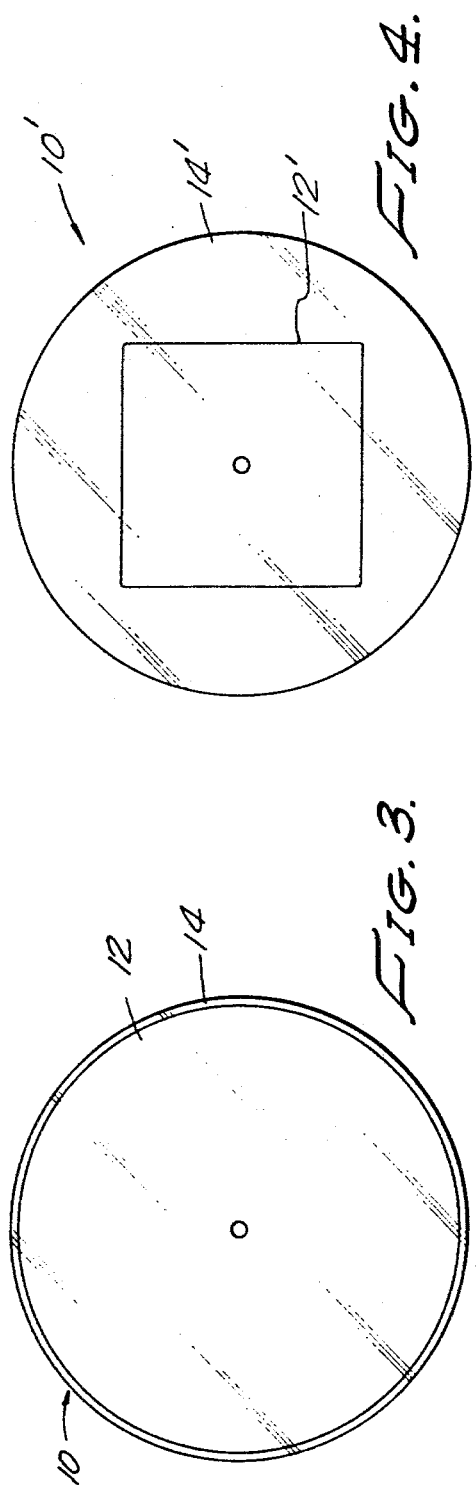

METHOD OF MAKING PICTURE PHONOGRAPH RECORD

This application is a division of my pending application for U.S. Pat. Ser. No. 945,305, filed Sept. 25, 1978, which is a continuation-in-part of my application Ser. No. 836,500, filed Sept. 26, 1977 entitled, PHONOGRAPH RECORD AND METHOD OF MARKING SAME, now abandoned.

This invention relates to phonograph records, and more particularly to an improved picture record and method of molding the same wherein the imprinted core sheet is sandwiched between transparent plastic layers one of which is relatively thick and rigid and dispersed from a hot fluent lump of plastic placed centrally of one imprinted face of the core sheet.

BACKGROUND OF THE INVENTION

Prior proposals for making picture records having visual material embedded in the record have utilized two transparent foils of plastic material and various techniques for securing the visual material captive therebetween. Such foils, being only a few mils thick, are very flexible. The foils warp and become wavy rendering the record unsaleable or, if occurring after purchase, cause the tone arm to jump track and leads to other malfunctioning results. To avoid these and other shortcomings proposals have been made to stiffen the record by inserting a plastic or resinous core layer between the sheets of visual material. Such a layer is formed by dispersing a hot lump of the resin placed centrally between the sheets of visual material to form a thick relatively stiff core having a diameter at least as great as the two foils. Two different modes of utilizing this technique are disclosed in Lash U.S. Pat. No. 3,578,539 and in Bardowicks et al U.S. Pat. No. 3,102,730. This expedient has been successful in providing a much stronger and more rigid record than that taught by the patent to Utiger U.S. Pat. No. 3,247,298. However, resort to these reinforcing expedients poses new problems. A lump of opaque material was invariably utilized and the insertion of this lump between separate sheets of visual material increased the number of assembly operations and the opportunities for assembly errors and resulted in a very high reject rate of unsaleable merchandise. A particularly serious cause of rejects is the tearing, rumpling, or damage to one or both sheets of visual material apparently produced by the drag forces of the lump as it is dispersed outwardly during the pressing operation.

SUMMARY OF THE INVENTION

This invention avoids the numerous short-comings and disadvantages of the aforementioned and other prior proposals for making picture records. The greatly improved product and method of making the same provided by this invention utilizes but three components consisting of a sheet of visual material sandwiched between two transparent plastic layers of widely differing thicknesses at least the thicker of which layers is inseparably adherent to the visual material. One layer comprises a relatively thin preformed foil and the other layer is relatively thick and rigid and dispersed during the molding operation from a hot fluent lump of transparent plastic placed against the outer face of the visual material. Heat added directly to the lump from its unshielded outwardly facing side during the molding operation assures a proper fluent condition of these outer portions with the result that the lump disperses without damaging the underlying visual material. Concurrently with this dispersal a sound track is impressed into the outer surface of the dispersing lump and, if desired and preferably, a sound track is also impressed into the outer surface of the foil layer. No bonding agent is utilized, it being found that the molding procedure herein disclosed provides a picture record in which both plastic layers and particularly the thicker layer, are inseparably adherent to the adjacent face of the visual material which delaminates but rarely and typically by shearing occurring between the faces of the visual sheet material itself rather than in the interface between the visual material and the plastic layer. The improved method is carried out with a time saving of at least one third over that typically used in making picture records wherein the plastic lump is sandwiched between a pair of picture sheets.

Accordingly, it is a primary object of this invention to provide a new and improved picture phonograph record and a simpler, faster and more efficient method of making the same with a substantially lower reject rate.

Another object of the invention is the provision of an improved lightweight, thinner, more flexible and durable picture record of superior quality.

Another object of the invention is the provision of a picture phonograph record having double faced visual material sandwiched between two transparent plastic layers one of which comprises a preformed foil and the other of which is relatively thick and rigid and dispersed from a hot fluent lump of plastic while being heated from the outwardly facing side thereof.

Another object of the invention is the provision of an improved picture phonograph record having a double faced sheet of visual material sandwiched between relatively thin and thick layers of transparent plastic material, the thick layer being formed from a preheated lump of plastic while being concurrently dispersed and impressed with a sound track.

These and other more specific objects will appear upon reading the following specification and claims and upon considering in connection therewith the attached drawing to which they relate.

Referring now to the drawing in which a preferred embodiment of the invention is illustrated:

FIG. 1 is an exploded cross-sectional view through a pair of sound track mold members with the initial components of the invention phonograph record positioned therebetween prior to closing the mold:

FIG. 2 is a fragmentary cross-sectional view through a completed record;

FIG. 3 is a plan view of a record having a picture and/or label sandwiched between the opposite faces of the record and the diameter of which label is slightly less than the maximum diameter of the record; and FIG. 4 is a plan view of a second embodiment of the invention record showing a non-circular label sandwiched between the opposite faces of the record and having a maximum dimension substantially less than the diameter of the label shown in FIGS. 1 to 3.

Referring initially more particularly to FIGS. 1 to 3, there is shown a first illustrative embodiment of the improved picture phonograph record designated generally 10. This record comprises three components, namely, a clear or tinted transparent foil 11, a core or picture label unit 12, and a clear or tinted transparent plastic layer 13. Layer 13 is dispersed or extruded to shape from a thick heated lump 13' in FIG. 1 as will be described in greater detail presently and includes a thickened periphery 14 of teardrop or flattened teardrop shape in cross-section. The thickened periphery 14 embraces the outer rim of foil 11 to which it is intimately fused as an incident of the heated molding operation.

FIG. 1 shows a pair of mold platens 15, 16 of a type well known in the record-molding art to mold records while impressing sound tracks thereon. Upper platen 15 is provided at its corners with holes 17 to receive the centering pins 18 fixed to the lower platen 16 to assure accurate closure of the platens. Held assembled to the cavities of each of platens 15 and 16 via an associated keeper 19 are matrices 20, 21 each provided on its face with negatives of the sound tracks to be impressed upon the opposite faces of record 10. Upper platen 15 is provided with a centering pin 23 resiliently supported on a rubber buffer plug 24 in alignment with lower pin 25 fixed centrally of the cavity in platen 16. Both platens are provided in known manner with interconnected passages 26 through which heating and cooling fluids can be circulated during different stages of a record molding cycle.

A record molding cycle is carried out starting with the two platens 15, 16 in open position and heated to a suitable starting temperature such as 145°–150° F. All three components of the invention record are then loaded on to the lower mold 16. Typically, a circular transparent vinyl foil 11 having a thickness of a few mils and a central opening is assembled over pin 25 following which the core sheet or picture label 12 is superimposed thereon with its center opening in snug fitting registry with pin 25. It will be understood that sheet 12 imprinted with suitable visual material may comprise either a single sheet of paper stock or two sheets, preferably but not necessarily laminated together. The opposite faces of the visual material are imprinted with suitable similarly oriented indicia and typically include both printed indicia descriptive of the associated sound track and pictorial indicia. The loading operation is completed by placing a thick lump or patty 13' of clear or tinted plastic material, such as polyvinyl chloride, freshly taken in pre-heated fluent condition from an extruder at a temperature of about 300° F. and placed centrally of the upper face of sheet 12. The upper mold platen 15 is then closed and the mold assembly is placed in a hydraulic press and brought up to a suitable pressing temperature such as 175° to 200° F. This heating operation is initiated conventionally and when the mold reaches 175° to about 200° F. the press applies pressure ranging between 1900 and 2300 psi to the mold assembly and heating continues until the mold temperature rises to about 225° to 250° F.

Throughout the heating cycle the platens apply heat directly to foil 11 and lump 13'. It is found that the preheated innermost face of lump 13 becomes strongly adherent to the juxtaposed surface of sheet 12 as an incident to being placed in contact therewith and particularly when the press applies pressure to the lump. This portion of the lump does not move relative to the face of sheet 12, in part, because of its firm adherence thereto and due in part to the fact that overlying portions of the lump are warmer and more fluent and, in consequence, are more readily extruded or dispersed than the surface of the lump in direct contact with sheet 12. Accordingly, material 13' does not tear, rumple or damage the visual material by imparting any substantial drag forces thereon but instead the gradually expanding fluent material adheres to sheet 12 as it continues to expand and disperse outwardly thereover. Concurrently with the dispersion of the lump there is faithfully impressed into the upper surface thereof the sound track present on the juxtaposed matter matrix 20.

When the mold platens reach the upper temperature limit specified above the heating cycle is discontinued and the circulation of a cooling medium is initiated through the mold to cool it to approximately 150° F. At that time the mold is opened and the completed record is in readiness for removal from the mold to complete a normal molding cycle in about 35 to 40 seconds.

Lump 13' is prepared from plastic pellets placed in a plastic extruder. A quantity of approximately 4 to 5 ounces per record is utilized in making a typical 12 inch record and issues from the extruder at a temperature of about 300° F. A lump of this size forms a transparent layer having a thickness of 15 to 25 mils, or many times the thickness of a typical foil 11. A somewhat greater quantity can be used to provide a heavier, stronger and less flexible record. Excess material from the lump forms a flash which is trimmed away following opening of the mold assembly.

At least the relatively thick rigid layer formed by lump 13' and usually the relatively thin foil layer as well are found to adhere so strongly and tenaciously to the paper sheet of visual material that neither layer can be separated except by shearing the paper stock between the faces thereof. No adhesive or bonding agent is utilized or necessary.

A further unique characteristic of the invention article and method of making the same resides in the discovery that the sound tracks are virtually noise-free. This is believed due to the fact that any foreign particles which may settle or collect on the sound track matrix while the mold is open become embedded in the lump of material 13' without causing any defect or deformity in the sound track itself. Accordingly, the property and capability of this material to capture and engulf foreign material while in a semi-plastic condition are utilized to eliminate noise by the simple expedient of reversing the order of inserting the components so as to insert the lump first against one platen and then against the other when molding successive records. Oftentimes, the advantages are assured by placing the lump against the lower platen only after a limited number of records have been molded with the lump uppermost. Excess material of the lump forms a flash about the periphery of the record which is trimmed away following opening of the platens.

As is made clear by FIG. 2, the faces of the record inwardly of the sound track, as well as surrounding the outer periphery thereof, are thicker than the portion of the record bearing the sound track. In consequence there is no risk of injury to the sound track when a pair of aligned records are placed against one another.

FIG. 4 shows a second embodiment of the invention differing from the first only in that the sheet of visual material 12' is substantially smaller in area than in the first embodiment. It will be understood that this sheet may be contoured to any shape and size less than the diameter of foil 11 without interfering with the fidelity of the sound track impressed upon foil 11 or layer 13.

While the particular method of making a picture phonograph record herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. That method of making a disc phonograph record having embedded visual material which comprises: providing at least one of a pair of record mold platens with a master sound track matrix; inserting the components of a three-part record assembly between said platens while open which assembly consists of a sheet carrying printed material sandwiched between a transparent plastic foil and a hot freshly extruded fluent lump of transparent plastic material facing toward said master matrix; closing said platens while heated against said record assembly to flatten and disperse said lump over the adjacent face of said sheet and to fuse the periphery thereof to the periphery of said foil; and cooling said platens and removing the record therefrom.

2. That method defined in claim 1 characterized in the step of impressing said sound track onto said lump of plastic concurrently with the dispersion thereof outwardly over said sheet of printed material.

3. That method defined in claim 1 characterized in the step of using a lump of plastic adequate to provide a plastic layer several times thicker than said foil.

4. That method defined in claim 1 characterized in the step of impressing a sound track into the outer faces of said foil and of said lump as said lump is being dispersed over the face of said sheet of printed material.

5. That method defined in claim 1 characterized in the step of using paper stock for said sheet of printed material.

6. That method defined in claim 1 characterized in repeating the steps of claim 1 and periodically inverting said three-part record assembly when inserting the same between the open mold platens to position said lump facing the lower platen for one record assembly and facing the upper platen of a preceding record assembly.

7. That method of making a phonograph record with embedded indicia in a pressing mold having upper and lower platens at least one of which carries a master sound track matrix, said method comprising: placing a transparent plastic foil on one of said platens; superimposing thereover an imprinted core sheet of smaller area than said foil; placing a lump of preheated fluent transparent plastic material centrally of said imprinted core sheet; and heating and closing said mold platens to flatten and dispense said plastic material to form a unitary record having a replica of said sound track matrix impressed into said lump with said imprinted core sheet embedded therein and adherent to said plastic material and visible through the face thereof.

8. That method defined in claim 7 characterized in providing said imprinted core sheet with printed material on both faces thereof which is visible through a respective transparent face of said record.

9. That method defined in claim 8 characterized in the step of providing both of said upper and lower mold platens with master sound track matrices and impressing the sound track into a respective face of said record as said mold platens are closed and as said hot lump of plastic is dispersing over said core sheet and into a fused junction with the periphery of said plastic foil.

10. A method of pressing records carrying embedded visual material which comprises: providing upper and lower mold platens with a respective sound track matrix; inserting a flexible transparent plastic foil onto one mold platen; providing the other mold platen centrally thereof with a lump of preheated fluent transparent plastic, and heating and closing said mold platens with a core sheet imprinted with indicia sandwiched between and in contact with said foil and said lump of plastic thereby to disperse said lump to form a relatively thick rigid layer impressed with a sound record with the face of said core sheet inseparably adherent to a respective one of said transparent plastic layers and visible therethrough.

* * * * *